(12) United States Patent
Penna et al.

(10) Patent No.: US 10,616,005 B1
(45) Date of Patent: Apr. 7, 2020

(54) ROBUST NOISE POWER ESTIMATION

(71) Applicant: Samsung Electronics Co., Ltd., Suwon-si, Gyeonggi-do (KR)

(72) Inventors: Federico Penna, San Diego, CA (US); Hongbing Cheng, San Diego, CA (US); Kee-Bong Song, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/264,120

(22) Filed: Jan. 31, 2019

Related U.S. Application Data

(60) Provisional application No. 62/772,533, filed on Nov. 28, 2018.

(51) Int. Cl.
*H04L 25/02* (2006.01)
*H04L 27/26* (2006.01)
*G06F 17/14* (2006.01)

(52) U.S. Cl.
CPC ........ *H04L 25/0214* (2013.01); *G06F 17/142* (2013.01); *H04L 25/0258* (2013.01); *H04L 27/265* (2013.01)

(58) Field of Classification Search
CPC ............... H04L 25/0214; H04L 27/265; H04L 25/0258; G06F 17/142
See application file for complete search history.

(56) References Cited

U.S. PATENT DOCUMENTS

| | | | |
|---|---|---|---|
| 6,556,871 B2 | 4/2003 | Schmitt et al. | |
| 6,744,813 B1 * | 6/2004 | Ko | H04B 3/46 375/224 |
| 7,492,703 B2 | 2/2009 | Lusky et al. | |
| 7,684,528 B2 | 3/2010 | Ojard et al. | |
| 8,509,325 B2 | 8/2013 | Mantravadi et al. | |
| 9,026,404 B2 | 5/2015 | Peng et al. | |
| 9,374,245 B2 | 6/2016 | Garrett et al. | |

(Continued)

FOREIGN PATENT DOCUMENTS

| | | |
|---|---|---|
| CN | 103402249 B | 12/2015 |
| WO | 2017187230 A1 | 11/2017 |
| WO | 2018070907 A1 | 4/2018 |

OTHER PUBLICATIONS

Yu, Tsung-Han, et al. "Cognitive Radio Wideband Spectrum Sensing Using Multitap Windowing and Power Detection with Threshold Adaptation", 2010 IEEE International Conference on Communications, May 23-27, 2010, pp. 1-6, Cape Town, South Africa.

*Primary Examiner* — Jean B Corrielus
(74) *Attorney, Agent, or Firm* — Lewis Roca Rothgerber Christie LLP

(57) ABSTRACT

A method for estimating noise in a channel impulse response measurement. In some embodiments, the method includes calculating a first average energy, the first average energy being an average energy of a sequence of time-domain samples of the channel impulse response measurement; setting a detection threshold; identifying a first subset of the sequence of time-domain samples, each element of the first subset of the sequence of time-domain samples having an energy less than the detection threshold; and calculating a second average energy, the second average energy being an average energy of the first subset of the sequence of time-domain samples.

20 Claims, 6 Drawing Sheets

(56) References Cited

U.S. PATENT DOCUMENTS

| | | | |
|---|---|---|---|
| 9,756,657 B2 | 9/2017 | Jiang et al. | |
| 2003/0058962 A1* | 3/2003 | Baldwin | H04L 1/20 375/316 |
| 2003/0072392 A1* | 4/2003 | Beadle | H04B 17/336 375/316 |
| 2006/0133526 A1* | 6/2006 | Zhang | H04L 27/2613 375/260 |
| 2008/0056343 A1* | 3/2008 | Rajagopal | H04L 25/03006 375/232 |
| 2009/0168929 A1* | 7/2009 | Liu | H03G 3/345 375/346 |
| 2015/0318946 A1 | 11/2015 | Abdelmonem et al. | |
| 2016/0128070 A1* | 5/2016 | Hanusch | H04W 74/0808 370/252 |
| 2017/0338843 A1 | 11/2017 | Wang et al. | |
| 2018/0302210 A1* | 10/2018 | Hedin | H04B 7/2656 |

\* cited by examiner

ROBUST NOISE POWER ESTIMATION

CROSS-REFERENCE TO RELATED APPLICATION(S)

The present application claims priority to and the benefit of U.S. Provisional Application No. 62/772,533, filed Nov. 28, 2018, entitled "ROBUST NOISE POWER ESTIMATION FOR WIRELESS DIGITAL RECEIVERS", the entire content of which is incorporated herein by reference.

FIELD

One or more aspects of embodiments according to the present disclosure relate to noise estimation, and more particularly to a system and method for noise power estimation using a measured channel impulse response.

BACKGROUND

In a wireless system, it may be advantageous to have an accurate measure of the noise level at the receiver, so that various corrections may be made for the noise. The noise level may be measured, for example, by the average power of a sequence of consecutive samples of the channel impulse response, wherein the selected samples are believed not to contain signal components. The channel impulse response may be extracted by an inverse fast Fourier transform (IFFT) of a properly processed reference signal or pilot sequence available at the receiver.

For example, in an orthogonal frequency-division multiplexing (OFDM) system such as 3GPP Long Term Evolution (LTE) or New Radio (NR), the demodulation reference signals (DMRS) may be used for the extraction of the channel impulse response. The DMRS may be transmitted in a plurality of resource elements, wherein a resource element may be a time-frequency unit in the OFDM grid (i.e., one OFDM symbol in the time domain and one subcarrier in the frequency domain). The signal in the DMRS resource elements may be descrambled by multiplying it by the complex conjugate of the known scrambling sequence; then, despreading may be performed, by multiplying the signal by a known orthogonal cover code in the time domain and/or frequency domain. The channel impulse response may be then calculated as the inverse fast Fourier transform (IFFT) of the de-spread descrambled signal. The noise may then be estimated using the calculated channel impulse response.

Using a predefined sequence of consecutive samples, of the inverse fast Fourier transform, however, may result in an inaccurate estimate if the sequence of samples used includes samples that are likely to contain a significant amount of signal energy. Although OFDM systems such as Long Term Evolution are mentioned herein as applications to which the present disclosure may be relevant, the relevance of this disclosure is not limited to such systems, and it may be relevant to any system in which, in a sequence of samples, all of which contain noise, and some of which also contain signal, the influence of samples containing signal is to be reduced in forming an estimate of the noise power.

SUMMARY

According to some embodiments of the present disclosure, there is provided a method for estimating noise in a channel impulse response measurement, the method including: calculating a first average energy, the first average energy being an average energy of a sequence of time-domain samples of the channel impulse response measurement; setting a detection threshold; identifying a first subset of the sequence of time-domain samples, each element of the first subset of the sequence of time-domain samples having an energy less than the detection threshold; and calculating a second average energy, the second average energy being an average energy of the first subset of the sequence of time-domain samples.

In some embodiments, the setting of the detection threshold includes: selecting the detection threshold to correspond, based on the first average energy, to a target false alarm probability, the target false alarm probability being less than 10%; or selecting the detection threshold to correspond, based on the first average energy, to a target estimation bias, the target estimation bias being less than 10% of the first average energy.

In some embodiments: the calculating of the first average energy includes calculating a total energy of the sequence of time-domain samples; and the calculating of the second average energy includes: setting an intermediate energy value equal to the total energy of the sequence of time-domain samples; setting an intermediate sample count equal to a size of the sequence of time-domain samples; for each sample, of the sequence of time-domain samples, that is not an element of the first subset: subtracting, from the intermediate energy value, an energy of the sample, and subtracting one from the intermediate sample count; and setting the second average energy equal to: a final value of the intermediate energy value, divided by a final value of the intermediate sample count.

In some embodiments, the calculating of the second average energy includes: setting an intermediate energy value equal to zero; setting an intermediate sample count equal to zero; for each sample, of the sequence of time-domain samples, that is not an element of the first subset: adding, to the intermediate energy value, an energy of the sample, and adding one to the intermediate sample count; and setting the second average energy equal to a numerator divided by a denominator, wherein: the numerator equals a difference of: the first average energy, and a quotient of: a final value of the intermediate energy value, and a size of the sequence of time-domain samples; and the denominator equals a difference of: 1, and a quotient of: a final value of the intermediate sample count, and the size of the sequence of time-domain samples.

In some embodiments, the method further includes calculating an inverse fast Fourier transform of a frequency domain channel response to form the channel impulse response measurement.

In some embodiments, the sequence of time-domain samples of the channel impulse response measurement is a plurality of consecutive samples of the inverse fast Fourier transform.

In some embodiments, a first-in-order sample of the sequence of time-domain samples is an nth element of the inverse fast Fourier transform, n being within 20% of one half of a size of the inverse fast Fourier transform.

In some embodiments, a last-in-order sample of the sequence of time-domain samples is an mth element of the inverse fast Fourier transform, m being within 20% of nine-tenths of the size of the inverse fast Fourier transform.

According to some embodiments of the present disclosure, there is provided a system for estimating noise, the system including: a receiver, and a processing circuit, the processing circuit being configured to: calculate a channel impulse response measurement; calculate a first average energy, the first average energy being an average energy of a sequence of time-domain samples of the channel impulse response measurement; set a detection threshold; identify a first subset of the sequence of time-domain samples, each element of the first subset of the sequence of time-domain samples having an energy less than the detection threshold; and calculate a second average energy, the second average energy being an average energy of the first subset of the sequence of time-domain samples.

In some embodiments, the setting of the detection threshold includes: selecting the detection threshold to correspond, based on the first average energy, to a target false alarm probability, the target false alarm probability being less than 10%; or selecting the detection threshold to correspond, based on the first average energy, to a target estimation bias, the target estimation bias being less than 10% of the first average energy.

In some embodiments, the setting of the detection threshold includes selecting the detection threshold to correspond, based on the first average energy, to a target false alarm probability, the target false alarm probability being less than 10%.

In some embodiments, the setting of the detection threshold includes selecting the detection threshold to correspond, based on the first average energy, to a target estimation bias, the target estimation bias being less than 10% of the first average energy.

In some embodiments: the calculating of the first average energy includes calculating a total energy of the sequence of time-domain samples; and the calculating of the second average energy includes: setting an intermediate energy value equal to the total energy of the sequence of time-domain samples; setting an intermediate sample count equal to a size of the sequence of time-domain samples; for each sample, of the sequence of time-domain samples, that is not an element of the first subset: subtracting, from the intermediate energy value, an energy of the sample, and subtracting one from the intermediate sample count; and setting the second average energy equal to: a final value of the intermediate energy value, divided by a final value of the intermediate sample count.

In some embodiments, the calculating of the second average energy includes: setting an intermediate energy value equal to zero; setting an intermediate sample count equal to zero; for each sample, of the sequence of time-domain samples, that is not an element of the first subset: adding, to the intermediate energy value, an energy of the sample, and adding one to the intermediate sample count; and setting the second average energy equal to a numerator divided by a denominator, wherein: the numerator equals a difference of: the first average energy, and a quotient of: a final value of the intermediate energy value, and a size of the sequence of time-domain samples; and the denominator equals a difference of: 1, and a quotient of: a final value of the intermediate sample count, and the size of the sequence of time-domain samples.

In some embodiments, the calculating of the channel impulse response measurement includes calculating an inverse fast Fourier transform of a frequency domain channel response.

In some embodiments, the sequence of time-domain samples of the channel impulse response measurement is a plurality of consecutive samples of the inverse fast Fourier transform.

In some embodiments, a first-in-order sample of the sequence of time-domain samples is an nth element of the inverse fast Fourier transform, n being within 20% of one half of a size of the inverse fast Fourier transform.

In some embodiments, a last-in-order sample of the sequence of time-domain samples is an mth element of the inverse fast Fourier transform, m being within 20% of nine-tenths of the size of the inverse fast Fourier transform.

According to some embodiments of the present disclosure, there is provided a system for estimating noise, the system including: a receiver, and means for processing, the means for processing being configured to: calculate a channel impulse response measurement; calculate a first average energy, the first average energy being an average energy of a sequence of time-domain samples of the channel impulse response measurement; set a detection threshold; identify a first subset of the sequence of time-domain samples, each element of the first subset of the sequence of time-domain samples having an energy less than the detection threshold; and calculate a second average energy, the second average energy being an average energy of the first subset of the sequence of time-domain samples.

In some embodiments, the setting of the detection threshold includes: selecting the detection threshold to correspond, based on the first average energy, to a target false alarm probability, the target false alarm probability being less than 10%; or selecting the detection threshold to correspond, based on the first average energy, to a target estimation bias, the target estimation bias being less than 10% of the first average energy.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for robust noise power estimation provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In a wireless system, it may be advantageous, when performing channel estimation, to have an accurate measure of the received noise, so that a correction may be made for the noise. Channel estimation may involve, for example, descrambling and de-spreading of the signal in a plurality of a demodulation reference signal (DMRS) resource elements and then taking an inverse fast Fourier transform (IFFT); this inverse fast Fourier transform may be a measurement of the channel impulse response.

Figure 1:
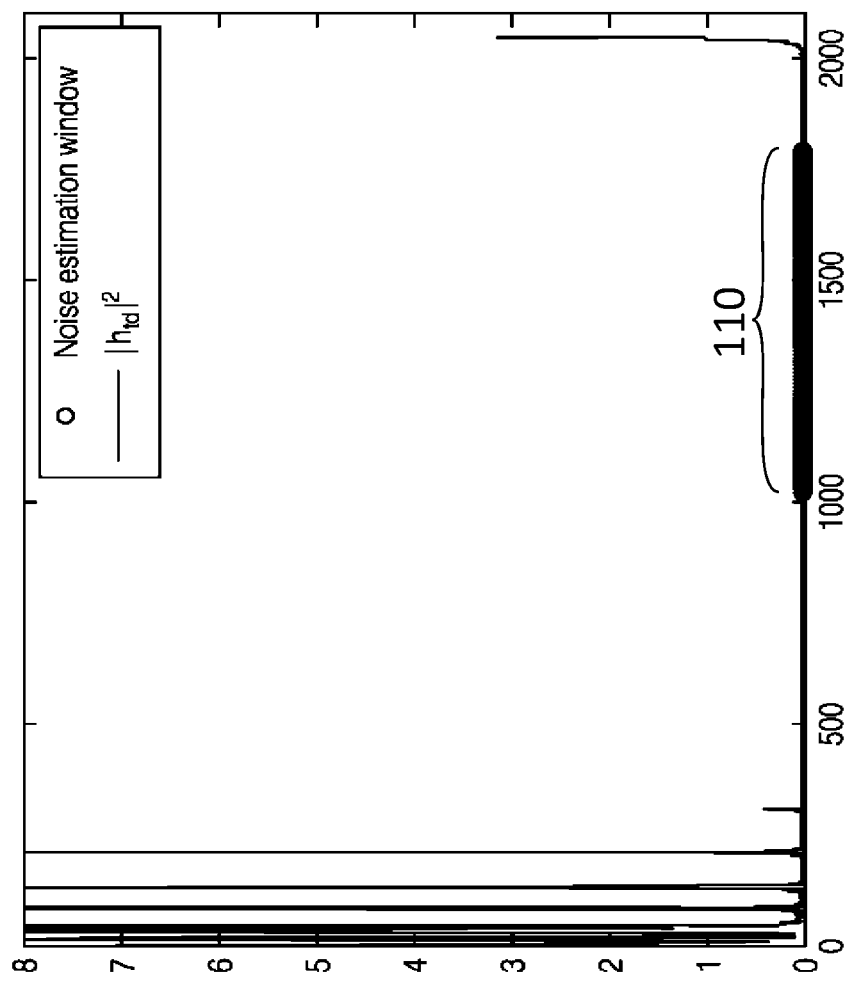
FIG. 1 is a channel impulse response, according to an embodiment of the present disclosure.

FIG. 1 shows a graph of the absolute square of a channel impulse response measurement (denoted as $h_{td}$ in the legend, where td stands for "time domain") that is the result of a 2048-point inverse fast Fourier transform. It includes 2048 samples, each of which is a complex number. A sequence of the samples 110 may then be used to estimate the received noise. For example, the sequence of consecutive samples beginning with the 1024th sample and ending with the 1800th sample (or, e.g., the 1792nd sample (1792 being fourteen sixteenths of 2048)) may be used, as shown in FIG. 1, or a sequence of consecutive samples may be used that extends from (i) a sample (referred to, in the claims, as a "first-in-order" sample) that is within 20% of the 1024th sample (i.e., that has an index greater than 0.80 times 1024 and less than 1.20 times 1024) to (ii) a sample (referred to, in the claims, as a "last-in-order" sample) that is within 20% of the 1800th sample (i.e., that has an index greater than 0.80 times 1800 and less than 1.20 times 1800). The energies of all of the samples (e.g., the squared magnitudes of the samples) may be summed to obtain the estimated total noise energy, which may be divided by the size of the sequence of samples 110 (i.e., divided by the number of samples in the sequence of samples 110) to obtain an estimate of the average noise energy per sample. As used herein, the "first-in-order" element of an ordered set is the first element of the set, and the "last-in-order" element of an ordered set is the last element of the set.

Figure 2:
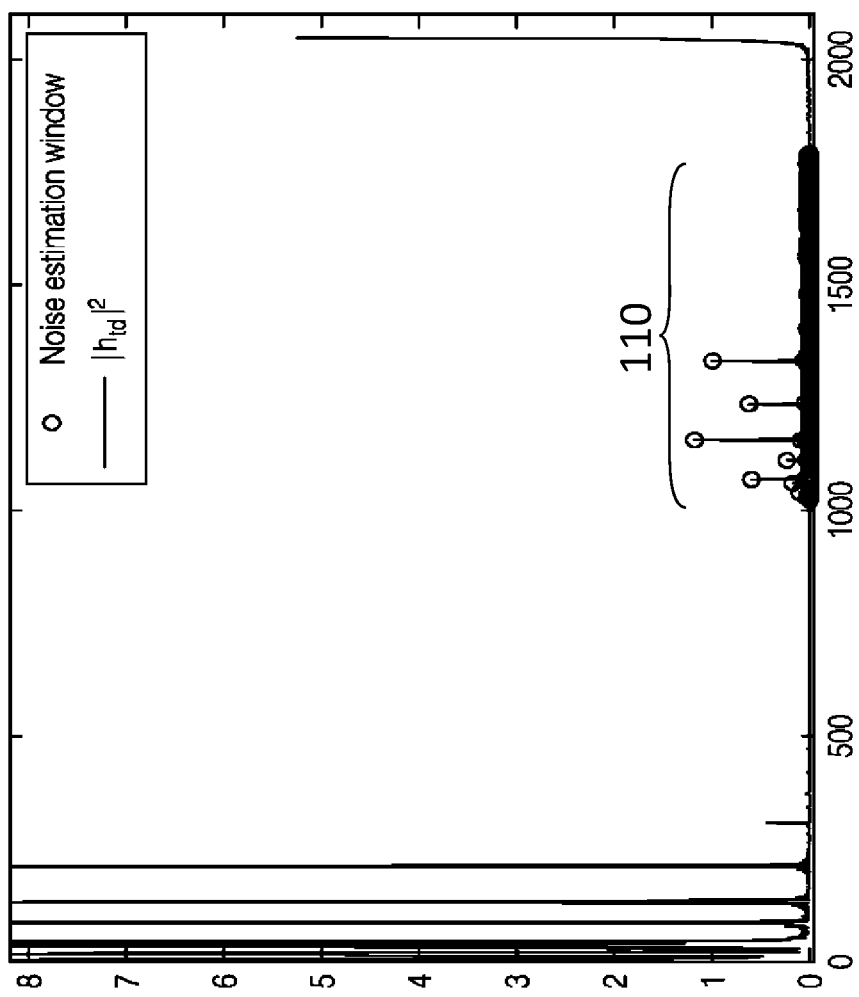
FIG. 2 is a channel impulse response, according to an embodiment of the present disclosure.

If the sequence of the samples 110 includes both noise energy and signal energy as shown in FIG. 2, then simply summing the squared magnitudes of the samples in the sequence of the samples 110 may result in an overestimate of the total noise energy, because signal energy will be included in the total. As such, it may be advantageous to remove each of the samples that contain a significant amount of signal energy. Signal energy may result, for example, from cross-layer interference in the case of multi-layer transmission, and/or from frequency selectivity of the wireless channel.

In some embodiments, contributions to the estimated total noise energy from samples that are likely to contain a significant amount of signal energy are avoided or removed. An initial average energy (or "first average energy") is calculated as the average energy of the sequence of time-domain samples of the channel impulse response measurement. Samples likely to contain a significant amount of signal energy are first identified by comparing each sample to a threshold (or "detection threshold") (set according to one of several methods, discussed in further detail below). An updated average energy (or "second average energy") is then calculated, based on the subset of the sequence of samples that includes all of the samples of the sequence of samples except those that have an energy exceeding the detection threshold (and are likely to contain a significant amount of signal energy)

In some embodiments, the detection threshold is selected to correspond, based on the first average energy, to a set target false alarm probability. The target false alarm probability may be, for example, equal to 1%, or to a value in the range from 0.01% to 10.00%. As used herein, a "false alarm" is the incorrect identifying, of a sample that does not include a significant amount of signal energy, as a sample that includes a significant amount of signal energy.

If the noise is complex Gaussian, the distribution of the energy of each sample, under a noise-only hypothesis, is a chi-squared distribution with 2 degrees of freedom, i.e., an exponential. The false alarm probability, $P_{fa}$, is the complementary cumulative density function (CDF) of the exponential distribution given the detection threshold t. The detection threshold may therefore be set according to the following equation:

$$t = -\sigma^2 \ln(P_{fa}),$$

where the first average energy may be used as an estimate of $\sigma^2$.

The false alarm probability may be set sufficiently low (i.e., the detection threshold may be set sufficiently high) that few samples that do not contain a significant amount of signal energy are excluded from the calculation of the second average energy. The false alarm probability may further be set sufficiently high (i.e., the detection threshold may be set sufficiently low) that at most a small proportion of samples that contain a significant amount of signal energy contribute to the second average energy (i.e., so that the "missed detection probability" is acceptably small).

Figure 3:
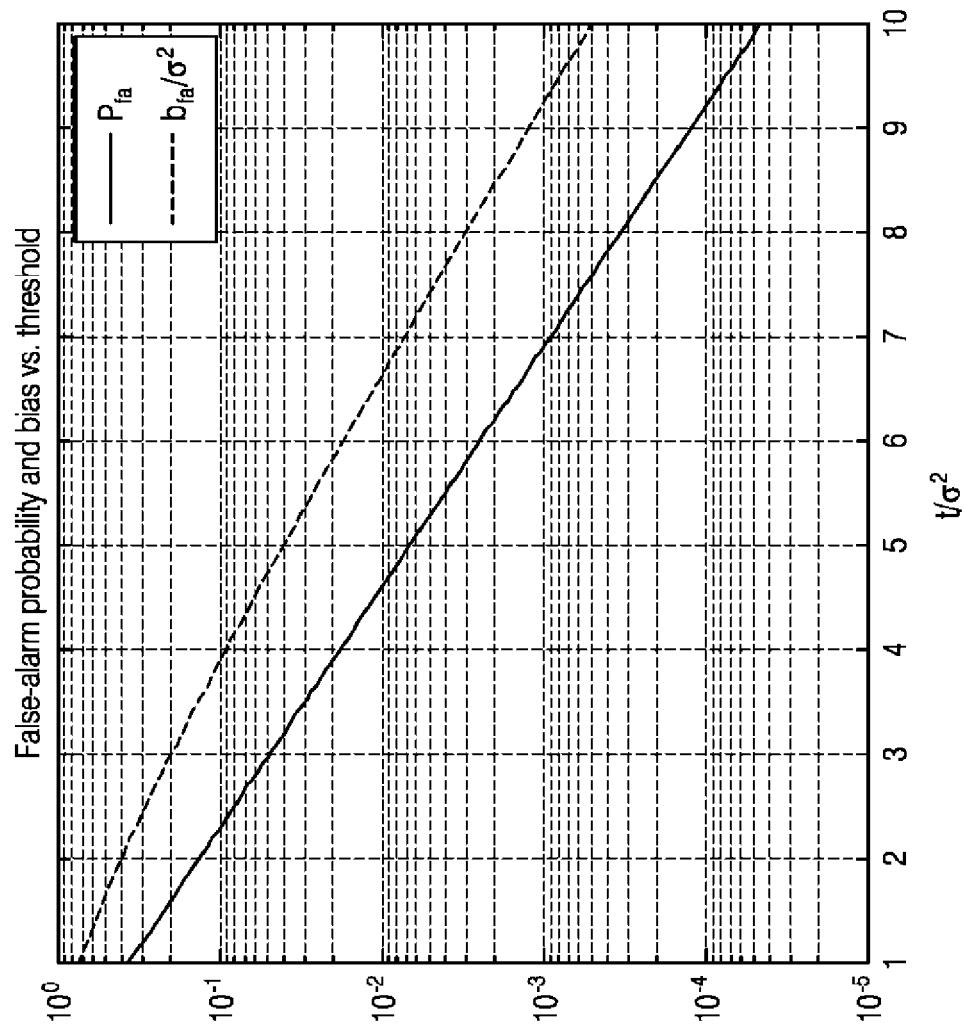
FIG. 3 is a graph for selecting a detection threshold, according to an embodiment of the present disclosure.

FIG. 3 shows the false alarm probability as a function of the ratio of the detection threshold to the first average energy. It may be seen from this graph that a false alarm probability of 0.01% may correspond to a detection threshold set to about 9.2 times the first average energy, a false alarm probability of 1% may correspond to a detection threshold set to about 4.6 times the first average energy, and a false alarm probability of 10% may correspond to a detection threshold set to about 2.3 times the first average energy.

In other embodiments, the detection threshold is selected to correspond, based on the first average energy, to a target estimation bias. False alarms may cause a bias in the second average energy because when samples are eliminated as a result of having an energy exceeding the detection threshold (i.e., the samples with the largest energy are eliminated), the remaining samples have an average energy that is lower than the first average energy. This may be the case even when no signal power is present in the sequence of samples, because of the random distribution of the noise power; in such a case, any samples that are eliminated are false alarms, and their elimination results in a reduction of the calculated value of the second average energy.

In some embodiments, the detection threshold is set to a value such that the bias caused by false alarms, based on the first average energy is, for example, equal to 0.01 times the first average energy, or to a value in the range from 0.001 times the first average energy to 0.5 times the first average energy.

In some embodiments, the bias may be related to the detection threshold according to the following equation:

$$b_{fa} = e^{-\frac{t}{\sigma^2}}(t + \sigma^2).$$

This equation may be inverted numerically (e.g., using a numerical root-finding method such as a Newton-Raphson method) to find, for any value of the bias, the corresponding value of the detection threshold.

FIG. 3 shows the bias (more specifically, the ratio of the bias to the first average energy) as a function of the ratio of the detection threshold to the first average energy. It may be seen from this graph that a bias equal to 0.001 times the first average energy may correspond to a detection threshold set to about 9.3 times the first average energy, a bias equal to 0.01 times the first average energy may correspond to a detection threshold set to about 6.6 times the first average energy, and a bias equal to 0.5 times the first average energy may correspond to a detection threshold set to about 1.7 times the first average energy.

In some embodiments, the calculation of the second average energy is performed as follows.

First, the first total energy is set to be equal to the total energy of the sequence of time-domain samples as follows:

$$S = \sum_{i=1}^{N} P_i$$

where $P_i$ is the energy of the i-th sample. Then a temporary variable, which may be referred to as the "intermediate energy value", S', is set equal to the first total energy:

$S'=S$, and a temporary variable, which may be referred to as the "intermediate sample count", N', is set equal to the size of the sequence of samples (i.e., set equal to the number of samples in the sequence of samples):

$N'=N$

The energy of each sample likely to contain a significant amount of signal energy is then subtracted from the intermediate energy value, and, for each such sample, the intermediate sample count is decreased by one, using, for example, a for loop as follows:

For $i=1:N$, if $P_i>t$ $S'=S'-P_i$ $N'=N'-1$

End

Finally, the second average energy is calculated from the final value of the intermediate energy value and from the final value of the intermediate sample count, as follows:

$\sigma_{new}^2=S'/N'$ where $\sigma_{new}^2$ is the second average energy. In this embodiment, if t is computed as a function of the false alarm probability or as a function of the bias, it may be a function of the first average energy, (and it may therefore depend on S/N). As such, this embodiment may involve storing S, and also storing S/N.

In other embodiments, the calculation of the second average energy is performed as follows, using a method for which storage of value of the total energy is not used.

First the value of the first average energy is calculated as follows:

$$\sigma^2 = \frac{1}{N}\sum_{i=1}^{N} P_i$$

Then the intermediate energy value, S', is set equal to zero:

$S'=0$, and the intermediate sample count, N', is set equal to zero:

$N'=0$

The energy of each sample likely to contain a significant amount of signal energy is then added to the intermediate energy value, and, for each such sample, the intermediate sample count is increased by one, using, for example, a for loop as follows:

For $i=1:N$, if $P_i>t$ $S'=S'+P_i$ $N'=N'+1$

End

Finally, the second average energy is calculated from the final value of the intermediate energy value and from the final value of the intermediate sample count, as follows:

$$\sigma_{new}^2 = \frac{\sigma^2 - S'/N}{1 - N'/N}.$$

Figure 4:
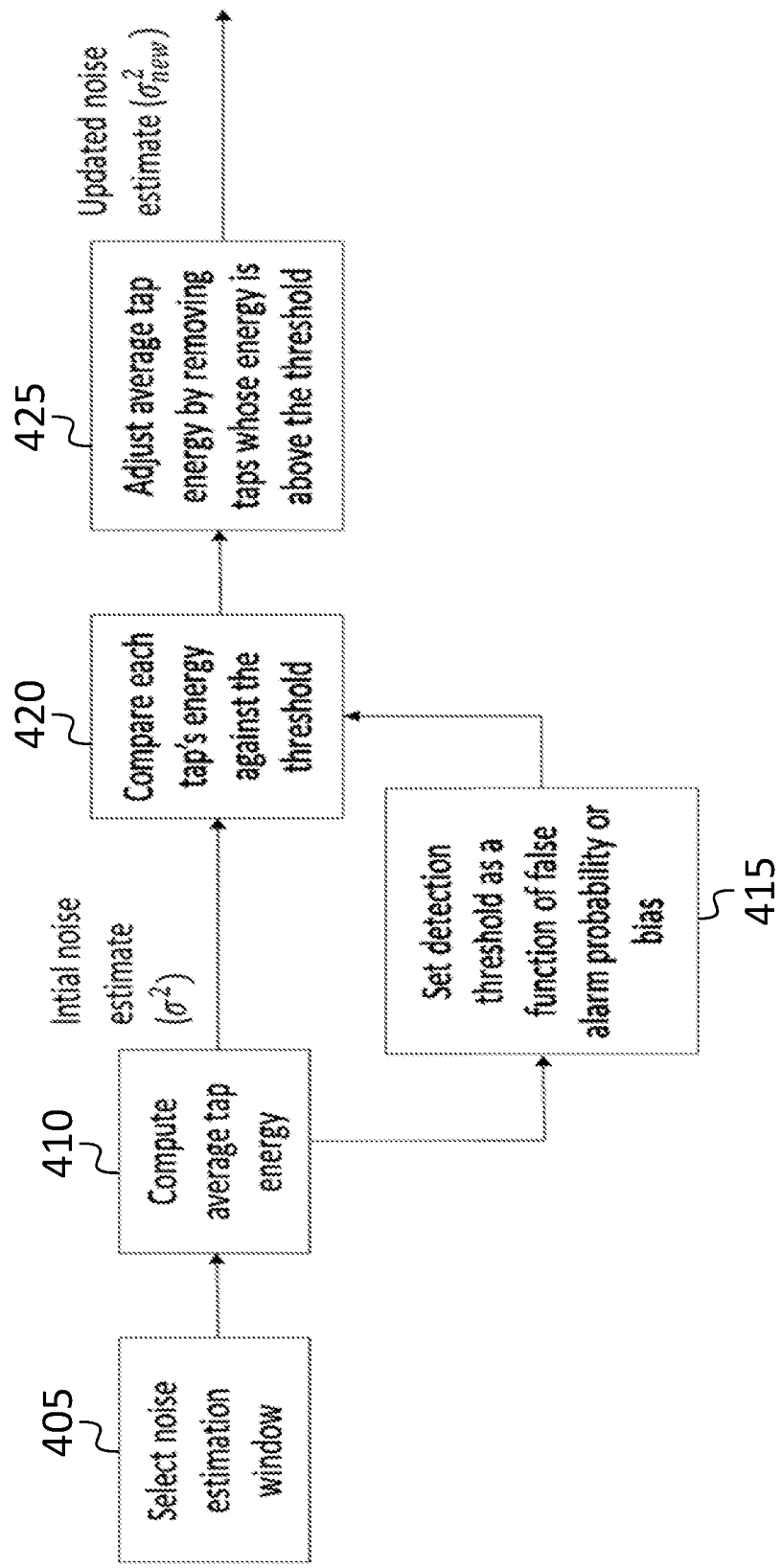
FIG. 4 is a flow chart for a method for noise power estimation, according to an embodiment of the present disclosure.

FIG. 4 is a flowchart of a method for noise power estimation, in some embodiments. An initial noise estimation window (corresponding to the sequence of time-domain samples) is selected at 405. A first average energy (or "average tap energy", or "initial noise estimate") is calculated at 410. The first average energy is used at 415 to set a detection threshold, either based on the false alarm probability or based on the bias. At 420, the energy of each sample is compared to the detection threshold, and at 425, the first average energy is adjusted by eliminating from it the contributions of samples that are likely to contain a significant amount of signal energy, to form the second average energy (or "updated noise estimate").

Figure 5:
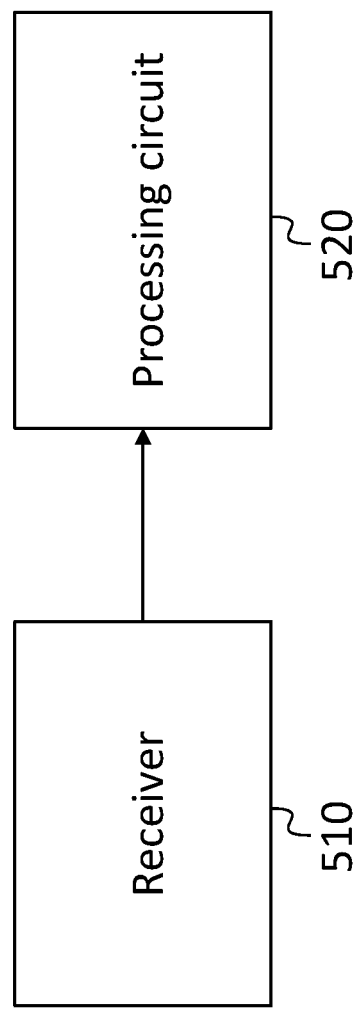
FIG. 5 is a block diagram of a system for performing a method for noise power estimation, according to an embodiment of the present disclosure.

FIG. 5 shows a system employing a method for noise power estimation in some embodiments. A receiver 510 receives, through one or more antennas in, or connected to, the receiver, radio frequency signals propagating in free space to the receiver from a transmitter. The receiver performs analog signal processing, e.g., amplifying the signals from the one or more antennas, and digitization (using analog to digital converters), converting the signals to digital form. Digital signals (e.g., the signals at the outputs of the analog to digital converters, or other digital signals derived from the signals at the outputs of the analog to digital converters) are fed to a processing circuit 520 (discussed in further detail below), which then takes an inverse fast Fourier transform of the channel response to form the channel impulse response, and performs noise power estimation according to a method described herein.

Figure 6:
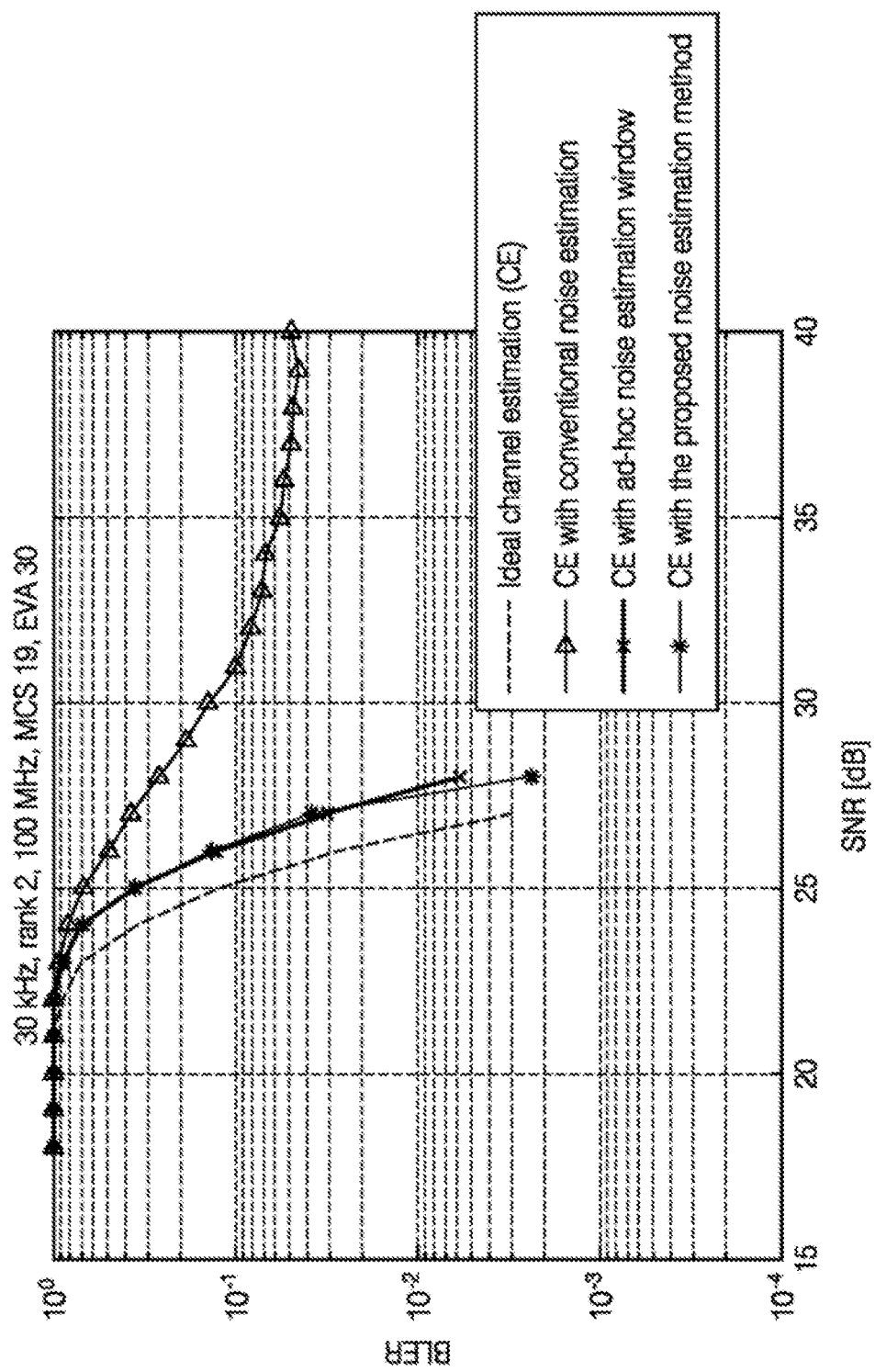
FIG. 6 is a graph comparing the performance of various methods for noise power estimation.

FIG. 6 shows the calculated block error rate (BLER) as a function of signal to noise ratio (SNR) for various assumptions. A curve labeled "Ideal channel estimation (CE)" shows the performance expected if the exact channel impulse response and noise level are known. A curve labeled "CE with conventional noise estimation" shows the performance expected if the samples from 8/16 n+14/16 n, i.e., from 1024 to 1792 of the inverse fast Fourier transform are used, with no measures taken to avoid the inclusion, in the noise estimate, of samples including a significant amount of signal energy. A curve labeled "CE with ad-hoc noise estimation window" shows the performance expected if a sequence of the samples of the inverse fast Fourier transform are used extending from a sample at 11/16 n to a sample at 14/16 n, with n being the number of samples of the inverse fast Fourier transform, with no measures taken to avoid the inclusion, in the noise estimate, of samples including a significant amount of signal energy, and with the window optimized ad-hoc for this specific case. A curve labeled "CE with the proposed noise estimation method" shows the performance expected of a method according to the present disclosure.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

As used herein, a "difference of" a and b means a-b, and a "quotient of" a and b means a divided by b.

It will be understood that, except in phrases such as "first-in-order", "second-in-order" and "last-in-order", the terms "first", "second", "third", etc., are only used to distinguish one element, component, region, layer or section from another element, component, region, layer or section. Thus, a first element, component, region, layer or section discussed herein could be termed a second element, component, region, layer or section, without departing from the scope of the present disclosure.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the present disclosure. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present disclosure refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range from "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for robust noise power estimation have been specifically described and illustrated herein, many modifications and variations will be apparent to those skilled in the art. Accordingly, it is to be understood that a system and method for robust noise power estimation constructed according to principles of this disclosure may be embodied other than as specifically described herein.

What is claimed is:

1. A method for estimating noise in a channel impulse response measurement, the method comprising:
    calculating a first average energy, the first average energy being an average energy of a sequence of time-domain samples of the channel impulse response measurement;
    setting a detection threshold;
    identifying a first subset of the sequence of time-domain samples, each element of the first subset of the sequence of time-domain samples having an energy less than the detection threshold; and
    calculating a second average energy, the second average energy being an average energy of the first subset of the sequence of time-domain samples.

2. The method of claim 1, wherein the setting of the detection threshold comprises:
    selecting the detection threshold to correspond, based on the first average energy, to a target false alarm probability, the target false alarm probability being less than 10%; or selecting the detection threshold to correspond, based on the first average energy, to a target estimation bias, the target estimation bias being less than 10% of the first average energy.

3. The method of claim 1, wherein:
the calculating of the first average energy comprises calculating a total energy of the sequence of time-domain samples; and
the calculating of the second average energy comprises:
setting an intermediate energy value equal to the total energy of the sequence of time-domain samples;
setting an intermediate sample count equal to a size of the sequence of time-domain samples;
for each sample, of the sequence of time-domain samples, that is not an element of the first subset:
subtracting, from the intermediate energy value, an energy of the sample, and
subtracting one from the intermediate sample count; and
setting the second average energy equal to:
a final value of the intermediate energy value, divided by
a final value of the intermediate sample count.

4. The method of claim 1, wherein the calculating of the second average energy comprises:
setting an intermediate energy value equal to zero;
setting an intermediate sample count equal to zero;
for each sample, of the sequence of time-domain samples, that is not an element of the first subset:
adding, to the intermediate energy value, an energy of the sample, and
adding one to the intermediate sample count; and
setting the second average energy equal to a numerator divided by a denominator, wherein:
the numerator equals a difference of:
the first average energy, and
a quotient of:
a final value of the intermediate energy value, and
a size of the sequence of time-domain samples; and
the denominator equals a difference of:
1, and
a quotient of:
a final value of the intermediate sample count, and
the size of the sequence of time-domain samples.

5. The method of claim 1, further comprising calculating an inverse fast Fourier transform of a frequency domain channel response to form the channel impulse response measurement.

6. The method of claim 5, wherein the sequence of time-domain samples of the channel impulse response measurement is a plurality of consecutive samples of the inverse fast Fourier transform.

7. The method of claim 6, wherein a first-in-order sample of the sequence of time-domain samples is an nth element of the inverse fast Fourier transform, n being within 20% of one half of a size of the inverse fast Fourier transform.

8. The method of claim 7, wherein a last-in-order sample of the sequence of time-domain samples is an mth element of the inverse fast Fourier transform, m being within 20% of nine-tenths of the size of the inverse fast Fourier transform.

9. A system for estimating noise, the system comprising:
a receiver, and
a processing circuit,
the processing circuit being configured to:
calculate a channel impulse response measurement;
calculate a first average energy, the first average energy being an average energy of a sequence of time-domain samples of the channel impulse response measurement;
set a detection threshold;
identify a first subset of the sequence of time-domain samples, each element of the first subset of the sequence of time-domain samples having an energy less than the detection threshold; and
calculate a second average energy, the second average energy being an average energy of the first subset of the sequence of time-domain samples.

10. The system of claim 9, wherein the setting of the detection threshold comprises:
selecting the detection threshold to correspond, based on the first average energy, to a target false alarm probability, the target false alarm probability being less than 10%; or
selecting the detection threshold to correspond, based on the first average energy, to a target estimation bias, the target estimation bias being less than 10% of the first average energy.

11. The system of claim 10, wherein the setting of the detection threshold comprises selecting the detection threshold to correspond, based on the first average energy, to a target false alarm probability, the target false alarm probability being less than 10%.

12. The system of claim 10, wherein the setting of the detection threshold comprises selecting the detection threshold to correspond, based on the first average energy, to a target estimation bias, the target estimation bias being less than 10% of the first average energy.

13. The system of claim 9, wherein:
the calculating of the first average energy comprises calculating a total energy of the sequence of time-domain samples; and
the calculating of the second average energy comprises:
setting an intermediate energy value equal to the total energy of the sequence of time-domain samples;
setting an intermediate sample count equal to a size of the sequence of time-domain samples;
for each sample, of the sequence of time-domain samples, that is not an element of the first subset:
subtracting, from the intermediate energy value, an energy of the sample, and
subtracting one from the intermediate sample count; and
setting the second average energy equal to:
a final value of the intermediate energy value, divided by
a final value of the intermediate sample count.

14. The system of claim 9, wherein the calculating of the second average energy comprises:
setting an intermediate energy value equal to zero;
setting an intermediate sample count equal to zero;
for each sample, of the sequence of time-domain samples, that is not an element of the first subset:
adding, to the intermediate energy value, an energy of the sample, and
adding one to the intermediate sample count; and
setting the second average energy equal to a numerator divided by a denominator, wherein:
the numerator equals a difference of:
the first average energy, and
a quotient of:
a final value of the intermediate energy value, and
a size of the sequence of time-domain samples; and the denominator equals a difference of:
 1, and
 a quotient of:
  a final value of the intermediate sample count, and the size of the sequence of time-domain samples.

15. The system of claim 9, wherein the calculating of the channel impulse response measurement comprises calculating an inverse fast Fourier transform of a frequency domain channel response.

16. The system of claim 15, wherein the sequence of time-domain samples of the channel impulse response measurement is a plurality of consecutive samples of the inverse fast Fourier transform.

17. The system of claim 16, wherein a first-in-order sample of the sequence of time-domain samples is an nth element of the inverse fast Fourier transform, n being within 20% of one half of a size of the inverse fast Fourier transform.

18. The system of claim 17, wherein a last-in-order sample of the sequence of time-domain samples is an mth element of the inverse fast Fourier transform, m being within 20% of nine-tenths of the size of the inverse fast Fourier transform.

19. A system for estimating noise, the system comprising:
 a receiver, and
 means for processing,
 the means for processing being configured to:
 calculate a channel impulse response measurement;
 calculate a first average energy, the first average energy being an average energy of a sequence of time-domain samples of the channel impulse response measurement;
 set a detection threshold;
 identify a first subset of the sequence of time-domain samples, each element of the first subset of the sequence of time-domain samples having an energy less than the detection threshold; and
 calculate a second average energy, the second average energy being an average energy of the first subset of the sequence of time-domain samples.

20. The system of claim 19, wherein the setting of the detection threshold comprises:
 selecting the detection threshold to correspond, based on the first average energy, to a target false alarm probability, the target false alarm probability being less than 10%; or
 selecting the detection threshold to correspond, based on the first average energy, to a target estimation bias, the target estimation bias being less than 10% of the first average energy.

\* \* \* \* \*